United States Patent Office 3,307,028
Patented Feb. 28, 1967

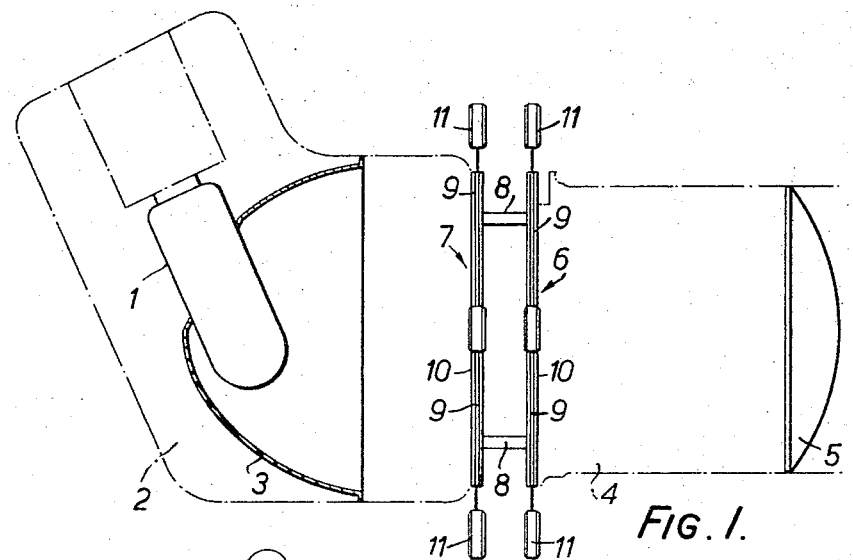
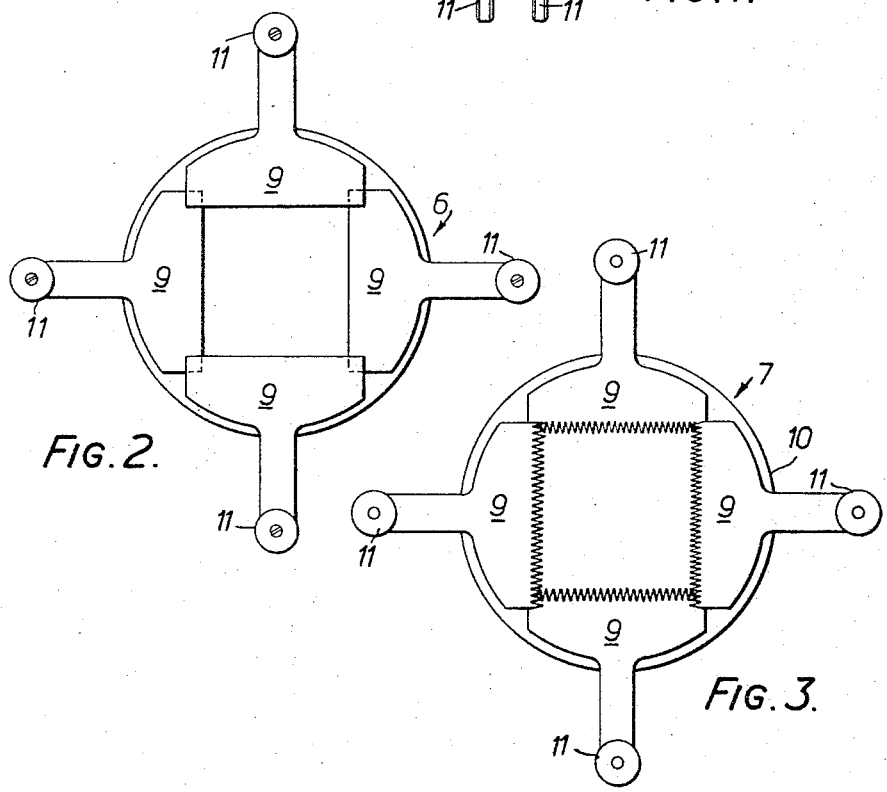
INVENTOR
F. P. Bentham

3,307,028
SPOTLIGHTS
Frederick Percy Bentham, London, England, assignor to The Strand Electric and Engineering Company Limited, London, England, a British company
Filed Sept. 10, 1964, Ser. No. 395,436
Claims priority, application Great Britain, Sept. 13, 1963, 36,189/63
3 Claims. (Cl. 240—46.03)

The present invention relates to spotlights of the type employed for the illumination of theatre stages and television or film sets or the like.

Spotlights for theatre and television productions are characterised by the need to adjust the angle of divergence of the beam of light emitted from the spotlight. The divergence of the beam is commonly required to be varied between a wide angle of divergence of, for example, 50°, and a narrow angle of divergence for example, 15°. For this purpose it has been proposed to mount the light source of a spotlight so that it can be moved towards and away from the lens. As the light source is caused to approach the lens the beam becomes wide and as it is moved away from the lens a distance equivalent to the focal length of the lens, the beam becomes narrow. The beam image projected is made up of the magnified image of the light source, usually but not necessarily, the filament of a tungsten lamp and although the beam is adjustable in divergence, its cross sectional contour is determined by the shape of the filament. The projected image is thus circular with more or less ill defined edges since the filament is at no time precisely focussed to produce an exact image because the beam would then exhibit the structure of the filament. What is required is a pool of light variable in area to be directed on actors or scenery.

In a further form of spotlight in common use the light from the light source is collected by a reflector or condenser system and directed through an aperture or gate, the edges of which can be varied in shape by means of shutters, an iris diaphragm or by the insertion of a metal slide with the required shape of aperture cut in it or a transparent slide part of which has been rendered opaque to give the required shape of aperture. In this further form of spotlight, an objective lens is used to focus the edges of the gate aperture and since the main object of this further form of spotlight is to produce beams having a cross sectional contour or profile other than circular, it is usual to provide several, for example four, independently operated shutter plates which form the edges of the gate aperture. By sliding the shutter plates inwardly or outwardly with respect to the axis of the beam and by angling their inner edges, a large variety of straight sided contours can be produced. The objective lens is usually a simple lens as only a focus of the edges of the gate aperture is required and nothing resembling the degree of definition of a lantern slide or film projector is needed or desirable. Very often hard profile edges of the beam are not required and the objective lens is moved to de-focus the image to some extent or alternatively a light break-up filter is placed on the front of the objective to "soften" the beam edges. In both these cases, however, all the edges of the beam will either be hard or softened.

It is an object of the present invention to provide a spotlight by means of which it is possible to "soften" one or more selected edge portions of the beam.

According to the present invention, a spotlight is provided with an apertured gate constructed to define the cross sectional profile of the beam projected by the spotlight and means for effecting de-focussing of at least one edge portion of the cross sectional profile of the beam. Preferably means are provided for effecting de-focussing of selected portions or the whole of the cross sectional profile of the beam.

In one form of spotlight embodying the invention an apertured gate is provided, the gate being composed of shutters which are individually adjustable in the direction of the focal axis of a lens provided to focus the spotlight beam.

In a preferred form of spotlight embodying the invention there are provided two apertured gates spaced one from the other with respect to the focal axis of a lens provided to focus the spotlight beam, one of the gates being positioned to be focussed by the lens to produce a beam, at least a portion of the profile of which is hard, the other gate being positioned so that at least a portion of the profile of the beam is soft. In this preferred construction each apertured gate is composed of four independently adjustable shutters. The edges of the shutters may be straight so that the shutter will define a rectangular aperture or the edges of the shutters may be curved so that the gate will define a curved or rounded cross sectional beam profile. By adjusting one or more of the shutters of the soft gate so that their edges intersect the beam the corresponding edges of the beam will be out of focus thereby to produce a "soft" effect. The softening effect produced by the shutters of the soft gate can be enhanced by serrating the respective edges of the shutters of the soft gate. By thus serrating the edges the spacing of the two gates required to produce a desired softening of the beam is considerably reduced. Instead of the soft gate as described, the spotlight may be provided with slots or guides to permit one or more individual shutters to be inserted so as to project into the beam of light produced by the hard gate.

A spotlight embodying the invention will now be described in greater detail by way of example with reference to the accompanying drawings in which:

FIGURE 1 is a diagrammatic side elevation of the spotlight;

FIGURE 2 is a front elevation of one of the shutters; and

FIGURE 3 is a front elevation of another shutter.

Referring to FIGURE 1 of the drawings, a lamp 1 is mounted in a housing 2 and provided with a reflector 3. Between the lamp housing and a housing 4 for a lens 5 are mounted apertured gates indicated generally at 6 and 7 spaced apart by spacing elements 8 and shown in greater detail in FIGURES 2 and 3 respectively. Each gate 6 and 7 comprises four shutters 9 in a frame 10, each shutter being provided with a knob 11 to facilitate separately sliding the shutters within their frames radially with respect to the axis of the reflector 3.

The "hard" gate 6 is constructed and positioned to produce a beam having hard edges and the "soft" gate 7 is constructed and positioned to produce a soft beam. It will be seen that the edges of the shutters 9 in FIGURE 2 are straight and define a rectangular aperture. In FIGURE 3 the shutters define a rectangular aperture but the edges of the shutters are serrated to produce the softening effect previously referred to. In adapting the spotlight described for the production of various desired effects, it will be seen that such effects can be produced by adjusting the position of any selected shutter in either the hard or the soft gate or both. Again the spacing between the hard and soft gates may be selected as desired.

In a further embodiment of the invention only one gate is employed and the shutters thereof are arranged to be individually movable in a direction along the focal axis of the lens. The shutters are normally positioned to produce a focussed beam and when it is desired to soften one or more edges of the beam the corresponding shutter or shutters is or are moved to a position in which it or they produce an un-focussed edge or un-focussed edges to the beam.

I claim:
1. A spotlight comprising in combination:
   (a) a housing,
   (b) a lamp holder mounted in said housing and adapted to support a lamp,
   (c) a projection lens spaced from said lamp housing and having its optic axis aligned with the position occupied by said lamp,
   (d) a beam-defining gate positioned about said optic axis intermediate and spaced from said lamp holder and said lens,
and
   (e) a beam-softening gate positioned about said optic axis spaced from said beam-defining gate, said beam-softening gate being constructed and adapted for movement in a plane normal to said optic axis into any one or more selected portions only of a beam passing through beam-defining gate.

2. A spotlight as claimed in claim 1 in which each of said beam-defining and beam-softening gates is comprised of a plurality of shutters individually adjustable towards and away from said optic axis.

3. A spotlight as claimed in claim 2 in which the shutters of said beam-softening gate are provided with serrated beam-intercepting edges.

References Cited by the Examiner

UNITED STATES PATENTS

| 369,453 | 9/1887 | Kuhn | 95—65 |
| 1,062,247 | 5/1913 | Moine | 95—65 |
| 1,766,637 | 6/1930 | Hopewell | 240—46.13 X |
| 2,361,765 | 10/1944 | Grimes | 240—46.03 X |

FOREIGN PATENTS

| 5,386 | 1899 | Great Britain. |

NORTON ANSHER, *Primary Examiner.*

C. R. RHODES, *Assistant Examiner.*